United States Patent
Besuchet et al.

(10) Patent No.: US 10,042,922 B2
(45) Date of Patent: Aug. 7, 2018

(54) DATABASE FOR CHATTER PREDICTIONS

(71) Applicant: Mikron Agie Charmilles AG, Nidau (CH)

(72) Inventors: Jean-Philippe Besuchet, Neuchatel (CH); Jérémie Monnin, Nidau (CH)

(73) Assignee: Mikron Agie Charmilles AG (CH)

( * ) Notice: Subject to any disclaimer, the term of this patent is extended or adjusted under 35 U.S.C. 154(b) by 441 days.

(21) Appl. No.: 14/629,964

(22) Filed: Feb. 24, 2015

(65) Prior Publication Data

US 2015/0254336 A1    Sep. 10, 2015

(30) Foreign Application Priority Data

Mar. 5, 2014 (EP) .................................... 14157853

(51) Int. Cl.
*G06F 17/30* (2006.01)
*G05B 15/02* (2006.01)
*B23Q 17/09* (2006.01)
*G05B 19/404* (2006.01)
*G05B 19/4065* (2006.01)

(52) U.S. Cl.
CPC ... *G06F 17/30705* (2013.01); *B23Q 17/0976* (2013.01); *G05B 15/02* (2013.01); *G05B 19/404* (2013.01); *G05B 19/4065* (2013.01); *G05B 2219/41256* (2013.01)

(58) Field of Classification Search
CPC .................. G06F 17/30705; B23Q 17/0976
See application file for complete search history.

(56) References Cited

U.S. PATENT DOCUMENTS

2006/0271231 A1* 11/2006 Olgac ................ B23Q 17/0976
700/159
2012/0093598 A1    4/2012 Ando et al.
(Continued)

FOREIGN PATENT DOCUMENTS

DE    4333286 A1    4/1994
DE    4405660 A1 *  8/1995 ......... G05B 19/4163
DE    4405660 A1    8/1995
(Continued)

OTHER PUBLICATIONS

Mamoru Mitsushi, Takaai Nagao, "An Open Architecture CNC CAD-CAM Machining System with Data-Base Sharing and Mutual Information Feedback", Jan. 8, 1997, CIRP Annals—Manufacturing Technology, vol. 46, No. 1, pp. 269-274.*
(Continued)

*Primary Examiner* — Davienne Monbleau
*Assistant Examiner* — Changhyun Yi
(74) *Attorney, Agent, or Firm* — Harness, Dickey & Pierce, P.L.C.

(57) ABSTRACT

A chatter database system, which includes a central chatter database, which is fed with data corresponding to the machining and chatter conditions of machining tools, particularly a milling, turning, drilling or boring machine. The data fed to the central chatter database is obtained and collected from at least two individual machining tools included in the chatter database system. The data is sent to the central chatter database via a data connection, preferably via a secured network, to generate chatter stability maps based on real encountered conditions.

13 Claims, 5 Drawing Sheets

(56) References Cited

U.S. PATENT DOCUMENTS

2012/0253708 A1 10/2012 Tanaka
2012/0318062 A1 12/2012 Tanaka

FOREIGN PATENT DOCUMENTS

| DE | 19643383 A1 | 5/1998 |
|----|---|---|
| EP | 1967320 A1 | 9/2008 |
| EP | 2614922 A1 | 7/2013 |
| JP | 2012-187685 A | 10/2012 |

OTHER PUBLICATIONS

English Tranlation of DE4405660A1.*
Graham et al., "Robust Prediction of Chatter Stability in Milling Based on the Analytical Chatter Stability", Journal of Manufacturing Processes 15 (2013) pp. 508-517.
Mitsushi et al., "An Open Architecture CNC CAD-CAM Machining System with Data-Base Sharing and Mutual Information Feedback", Annals of the CIRP 46 (1997) pp. 269-274.
Extended European Search Report for European Patent Application No. 14157853.4, dated Aug. 6, 2014, 8 pages.
Altintas et al., "Generalized Modeling of Mechanics and Dynamics of Milling Cutters", CIRP Annals, vol. 50/1 (2001) pp. 25-30.

* cited by examiner

DATABASE FOR CHATTER PREDICTIONS

CROSS-REFERENCE TO RELATED APPLICATIONS

This application claims the benefit and priority of European Patent Application No. 14157853.4, filed on Mar. 5, 2014. The entire disclosure of the above application is incorporated herein by reference.

BACKGROUND

This section provides background information related to the present disclosure which is not necessarily prior art.

Technical Field

The present invention relates to chatter database systems.

Discussion

High performance machining (HPM) processes face regularly the occurrence of chatter phenomenon restricting the quality of the final product (e.g. wavy surface finish, workpiece out of tolerances) and generating additional costs (e.g. excessive tool wear). Due to the closed-loop interaction between the cutting process and the machine tool structural dynamics, high amplitudes self-excited vibrations (chatter) can arise between the tool and the workpiece leading therewith to the mentioned quality problems. In order to face the always more severe market demand for HPM applications, machine tool manufacturers must propose solutions so that chatter problems can be reliably predicted, prevented and early detected.

Several ways exist for its suppression without leading to a loss of productivity. Among them, model-based techniques demonstrate the greatest potential. However, earlier studies pointed out the lack of reliability of chatter predictions based on physical models for the wide range of machining conditions encountered in practice. These predictions also require time-consuming procedures and most of the time expensive instrumentation. For all these reasons, the great potential of model-based methods for the control of such phenomenon is considerably reduced in practice.

The improvement of the chatter prediction techniques constitutes the first step required for the application of model-based techniques susceptible to prevent the machining process from chatter occurrence. For instance, based on these predictions, the machine may provide to the operator hints in order to reach optimal productivity guarantying chatter-free machining conditions without performing extensive machining tests itself.

A well designed chatter prediction application requires anyway a good level of understanding of the dynamics of the process along with the accurate modeling of the mechatronic system with all of its components: the machine, tool and workpiece.

In milling process, regenerative chatter is the most critical type of chatter. It is caused by the variable chip thickness generated by the current oscillations of the cutter in the workpiece material and the wavy surface left by the previous cut. Due to the phase between the variable cutting force exciting the machine structure and its vibrations, energy may be supplied to the oscillating system, leading to unstable self-excited vibrations. This phenomenon is characterized by a stability limit usually represented in terms of critical depth of cut (of the rotating tool in the workpiece in axial direction) in function of the spindle speed. This chart is commonly called "stability lobes diagram" because the stability limit corresponds to a series of lobes indicating spindle speeds where larger depths of cut may be selected before reaching the stability limit. An example of a so called stability lobes diagram is illustrated on the top diagram in FIG. 1 (source: Y. Altintas and S. Engin, "Generalized modeling of mechanics and dynamics of milling cutters", CIRP Annals, Vol. 50/1 (2001), p. 25-30).

If the stability lobes diagram can be reliably predicted, the chatter phenomenon can be controlled. For instance, if for a specific machining operation the operator knows the corresponding stability chart, he has the possibility to select machining parameters (e.g. spindle speed or depth of cut) accordingly, allowing a maximal machine productivity in chatter-free conditions (see FIG. 1).

Figure 1:
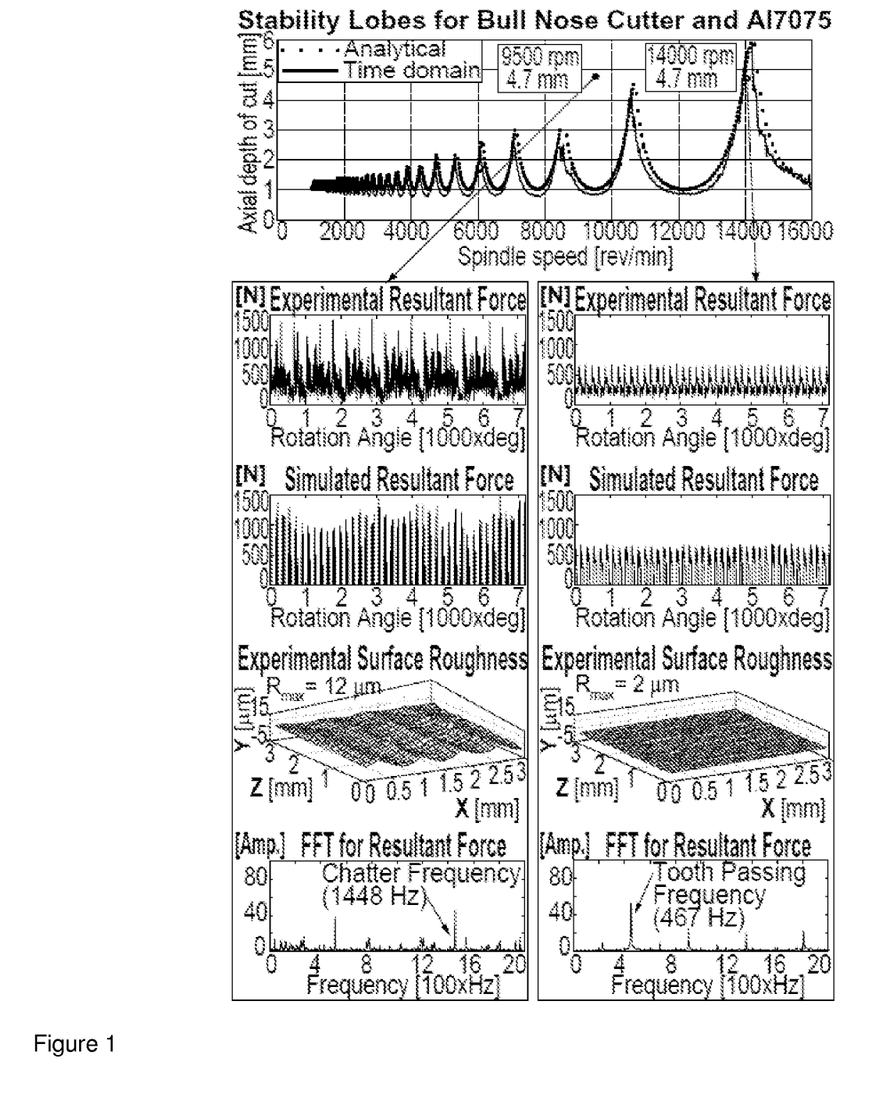
FIG. 1 is a stability lobes diagram illustrated on the top diagram.

FIG. 1 illustrates two selected machining conditions: The first one with a spindle speed of 9500 rpm and an axial depth of cut equal to 4.7 mm corresponds to a machining condition where chatter occurs. This is demonstrated by the lower left-hand side diagrams indicating much greater cutting forces and surface roughness than for the second condition—with a spindle speed of 14000 rpm and the same axial depth of cut—for which the milling process remains stable. The chatter frequency corresponding to the first condition is visible in the lowest left-hand side chart where for the second condition, only the tooth passing frequency harmonics are visible.

Stability lobes diagrams can be predicted using model-based techniques. This allows the operator to select optimal machining parameters without previously performing machining tests. However, model-based chatter stability predictions usually suffer of lack of reliability and their verification requires extensive machining tests.

State of the art today is the monitoring of chatter for database creation combined with a self-learning algorithm to accordingly adapt cutting parameters of machine tools.

It is known to measure operating parameters with computers, assessing these values with knowledge databases (expert systems) and determining optimal operating parameters. German Patent Document DE4333286 discloses for instance an expert system for diagnosing machine disturbances or errors.

German Patent Document DE19643383 discloses the measurement of operation parameters, including vibrations, with sensors and the analysis of these measured values and frequencies with a neuronal network. The system includes also a database for the storage of comparable values (expert system), which is used for a self-learning data processing and control of the machine.

The European Patent Document EP2614922 discloses a chatter detection and control system which adjusts the rotational speed of a spindle. The document US2012253708 discloses a device which analyses the measured frequencies and determines whether the generated chatter vibration is a regenerative chatter vibration, rotational-period forced chatter vibration, or flute-passage-period forced chatter vibration. US2012318062 can also determine the type of chatter vibration that occurred (e.g. chatter vibration occurring due to friction between a tool and a workpiece and occurring due to the impact force caused by machining).

Further publications like JP2012187685 of Okuma discloses chatter monitoring and control by adjusting spindle rotational speed.

On the market one will find different software applications for chatter detection and reduction by adapting cutting parameters.

The Manufacturing Automation Laboratories Inc. is developing a chatter avoidance software called "Chatter-Pro". It is a fully automated online chatter detection and avoidance program, and it is fully integrated to CNC milling systems. It monitors the process via a microphone and the machine controller to detect chatter. In case of chatter occurrence, it automatically stops the feed and adapts the spindle speed. In high speed milling operations, the software tries to increase the spindle speed to the nearest chatter free zone. In low speed milling, it applies spindle speed variation technique whereby the spindle speed is periodically modulated. This product is currently under the finishing stages of development.

The "Harmonizer" software by Manufacturing Laboratories Inc. uses microphones to detect chatter occurrence and suggests optimal spindle speed range. The user enters only the approximate spindle speed and the number of teeth on the cutter. The software can automatically set the threshold and indicates the presence of chatter in the recorded data. When chatter is detected, the software recommends a stable spindle speed, if one exists. This product is even available as a smart phone application for IOS and Android operating systems.

The CNC machine tool manufacturer OKUMA developed different systems for the chatter detection and mitigation under the name "Machining Navi". "Machining Navi L-g" is an option for lathes that is also operational at lower speeds. The system uses automatic spindle speed variation to suppress chatter.

The "Machining Navi M-g" option suggests a number of optimal spindle speeds based on the sound recorded by the microphone attached on the operation panel. The decision of changing the spindle speed is up to operator.

In "Machining Navi-l" option, built-in sensors detect chatter vibration and the spindle speed is automatically shifted to the ideal range.

The disadvantage of these known systems is either a) the lack of reliability of chatter predictions systems based on physical models in realistic milling conditions or b)—for the measure-based self-learning algorithms—the missing direct relation to the physics of the phenomenon, preventing as a matter of fact a real understanding of chatter occurrence. In addition to this, all known chatter predictions systems do not allow to extend their prediction method to a wider range of cutting conditions.

SUMMARY OF THE INVENTION

An aspect of the present invention is to provide a tool that can evaluate and predict the chatter stability of machining tools for a wide range of cutting conditions, improving therewith the prediction capability of known chatter predictions systems.

According to an aspect of the invention, a chatter database system includes a central chatter database, which is fed with data corresponding to the machining conditions (machining parameters) and measured chatter conditions of several machining tools of the same type (e.g. a milling, turning, drilling or boring machines) that are part of the chatter database system. These machining tools are connected to the central chatter database via a data connection/link, for instance a secured network. Parts of the chatter database system are at least two individual machining tools, preferably many more. The data fed to the central chatter database are obtained and collected from the connected machining tools included in the chatter database system. The central chatter database is herewith able to generate chatter stability maps based on the real conditions measured and monitored at the machining tools part of the system.

Thanks to the inventive chatter database system, the chatter stability maps generated by the data collected in the central chatter database are retrieved or sent back to the individual machining tools via the data connection, e.g. for being visualized at the control panels or user interfaces for the operator or by the CAM operator.

Preferably, the individual machining tools which are part of the chatter database system include each an automatic chatter detection system, which monitors the occurrence of chatter and generates accordingly the chatter data to be fed to the central chatter database. Usually, the individual machining tools include a machine controller which gathers/generates the machining condition data of its machine tool. Preferably, the chatter conditions and the machining condition data are gathered by the machine controller and transmitted via the data connection from the individual machining tool to the centralized chatter database.

A class identification system is preferably used by the chatter database system to define, from the machining condition data collected by each connected individual machining tools, sets of machining conditions for which chatter conditions provided by different machining operations can be equivalently compared in order to generate a unique stability map. Preferably, this class identification system is included in the central chatter database.

A chatter data verification system is preferably used to check the consistency of the chatter data collected by the central chatter database. If a connected machining tool delivers chatter condition data inconsistent with the other ones for equivalent machining conditions, the chatter data verification system, preferably included in the central chatter database, removes the corresponding data from the chatter database and delivers a warning signal to the corresponding machine controller.

The chatter database system preferably includes also a chatter prediction system to predict the occurrence of chatter for each set of machining conditions identified from the data provided by the connected machining tools. This chatter prediction system includes an embedded physical model which is used for calculating and predicting the occurrence of chatter based on machine parameter settings, whereby the physical model is adjusted for calculating chatter predictions in accordance with the experimental chatter stability maps generated in the central chatter database. Preferably, the adjustment of the embedded physical model occurs with an algorithm which considers new data fed to the central chatter database respectively the updated chatter stability maps. Most preferably, the adjustment occurs after a predefineable amount of new data sets fed to the central chatter database.

DETAILED DESCRIPTION OF THE PREFERRED EMBODIMENTS

Example embodiments will now be described more fully with reference to the accompanying drawings.

Figure 4:
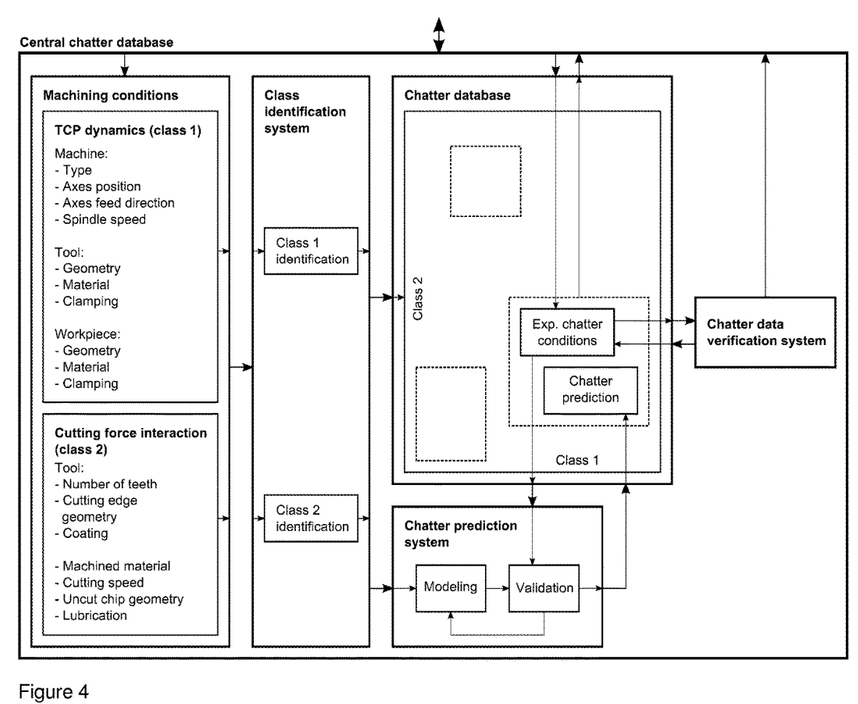
FIG. 4 illustrates the architecture of the central chatter database according to an embodiment of this invention.

In a preferred embodiment of the invention, the chatter prediction system is included in the central chatter database. The chatter prediction system provides chatter predictions based on its embedded physical model for each set of machining conditions identified in the central chatter database. The stored experimental chatter conditions for each set of machining conditions available in the central chatter database are used to validate and eventually adjust the embedded physical model. The resulting chatter prediction validated for a given set of machining conditions is then preferably stored in the central chatter database combined with the corresponding experimental chatter conditions. The architecture of the central chatter database according to this embodiment is represented in FIG. 4.

Alternatively, each of the connected individual machining tools includes a chatter prediction system, preferably implemented in the machine controller of the machining tools. That the prediction system retrieves from the central chatter database the stored experimental chatter conditions corresponding to machining conditions equivalent to machine parameter settings foreseen for the related individual machine tool to predict therewith the occurrence of chatter during the operation of the machine tool.

An advantage of the invention is that thanks to several machines connected to the system as much and as fast as possible experimental chatter data (e.g. machining parameters and respective chatter conditions) is collected so that a reliable representation of the effective chatter stability in various operational situations can be gathered and compared with the physical model-based predictions respectively calculations.

In case of difference between a calculated prediction and the corresponding generated chatter stability maps retrieved from the experimental chatter data, the next step according to the invention consists in using an algorithm for adapting the physical model (parameter tuning or extend characteristics) in order to get chatter stability predictions of the physical model in accordance with the reality as stored in the central chatter database (stability limits observed and measured during machining operations on existing machines). For instance, the adaption of the parameters of the physical model (e.g. natural frequency, damping ratio or cutting coefficients) can be adapted based on a preliminary sensitivity study as investigated by E. Graham et al. in "Robust prediction of chatter stability in milling based on the analytical chatter stability", Journal of Manufacturing Processes, 2013, (http://dx.doi.org/10.1016/j.jmapro.2013.08.005).

By doing so, the invention allows a better understanding of the chatter phenomenon and allows the adaptation respectively "fine-tuning" of the physical model in order to allow in an easy way a more reliable, model-based predictions.

A further advantage of the inventive systems is that the extensive experimental data necessary for the inventive purpose are gathered on several machines and as a side product under realistic machining conditions.

The possibility to detect inconsistent chatter condition data collected in the chatter database for equivalent machining conditions also enables the monitoring of the performance between the connected individual machining tools so that defects or wear problems can be automatically identified and reported. In case of inconsistent chatter data, the chatter data verification system informs the operator via the corresponding machine controller that a gap exists between the performance of his machine and the other networked machining tools and that a sanity check is recommended.

The originality and novelty of the proposed invention consists on one hand in collecting and managing data from several networked machines in order to generate a central chatter database with the chatter stability information for a wide range of cutting conditions in machining tools. Until now, only the data of one machine was considered, producing therewith just a comparably limited data record.

On the other hand, the originality and novelty of the proposed invention consists also in the use of the generated and extended chatter data information at the same time to refine the physical model for calculating predictions on the chatter behavior of machining tools.

With the invention a tool is provided that can evaluate the chatter stability respectively behavior of a machine tool for a wide range of cutting conditions. Thanks to several machines connected and part of the chatter database system, this is done fast.

Figure 2:
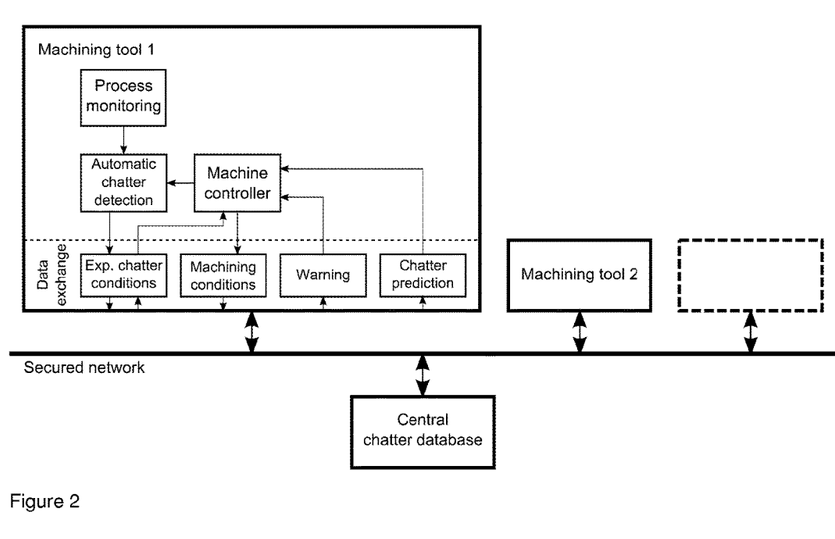
FIG. 2 illustrates schematically an example of the interaction between the different elements of the chatter database system according to an embodiment of the invention.

FIG. 2 illustrates schematically an example of the interaction between the different elements of the chatter database system according to the invention.

Based on the tool-workpiece vibrations monitored during the cut interaction and some further information (e.g. spindle speed and number of teeth of the cutter) provided by the machine controller of the monitored machine tool, the automatic chatter detection system of the machine is able to identify and characterize the current state of the machining process (e.g. stable cut or chatter with dominant chatter frequency) forming therewith the so called experimental chatter conditions (or chatter condition information). In order to collect the obtained data into a central chatter database indicated in the under part of the figure, the machine controller must provide on the other hand information about the corresponding tool center point (contact point between tool and workpiece) dynamics and the cutting force interaction so that the current machining conditions can be categorized and compared in the central chatter database with equivalent machining conditions from other networked machines. These machining conditions with the corresponding state of the milling process provided by the machine controller and the chatter conditions determined by the automatic chatter detection system form the so called chatter data which are forwarded to the central chatter database via an appropriate data connection (illustrated is a secured network). All these experimental data are then combined to create experimental stability maps susceptible to help the operator or the machine controller subsequently to select adequate machining parameters for new manufacturing processes. The central chatter database is consequently also used to provide to the machine controllers the stored chatter data (stored in chatter stability maps) collected from this machine or from other networked machines and corresponding to equivalent foreseen machining conditions. The chatter data transferred between the connected machines and the central chatter database might also contain chatter predictions generated by a chatter prediction system. Chatter predictions corresponding to the foreseen machining conditions are provided to the machine controller from the central chatter database wherein the chatter prediction system is integrated (see FIGS. 2 and 4). These predictions are based on a physical model, which predicts by calculation the occurrence of chatter for the foreseen machine conditions or settings, and may be represented in the form of stability lobes diagrams, helping the operator or the machine controller to select optimal chatter-free machining conditions (respectively machine settings).

The experimental data available from the central chatter database can consequently be used to verify the chatter predictions and eventually refine the physical model.

Figure 3A:
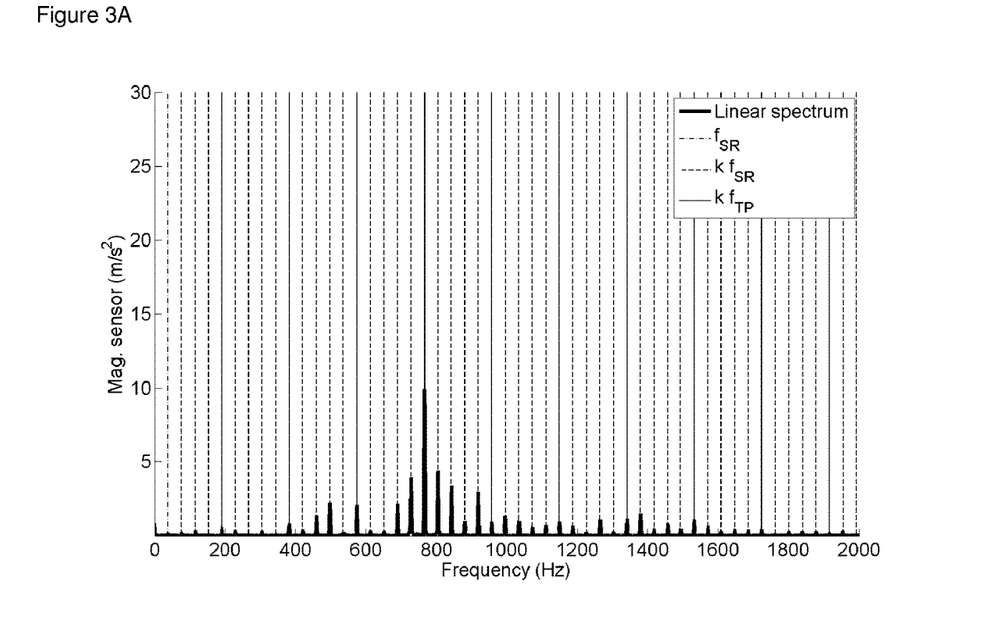
FIGS. 3A and 3B illustrate a linear spectrum of vibration sensor signal measured during milling operation in a chatter condition and a stable condition respectively.
Figure 3B:
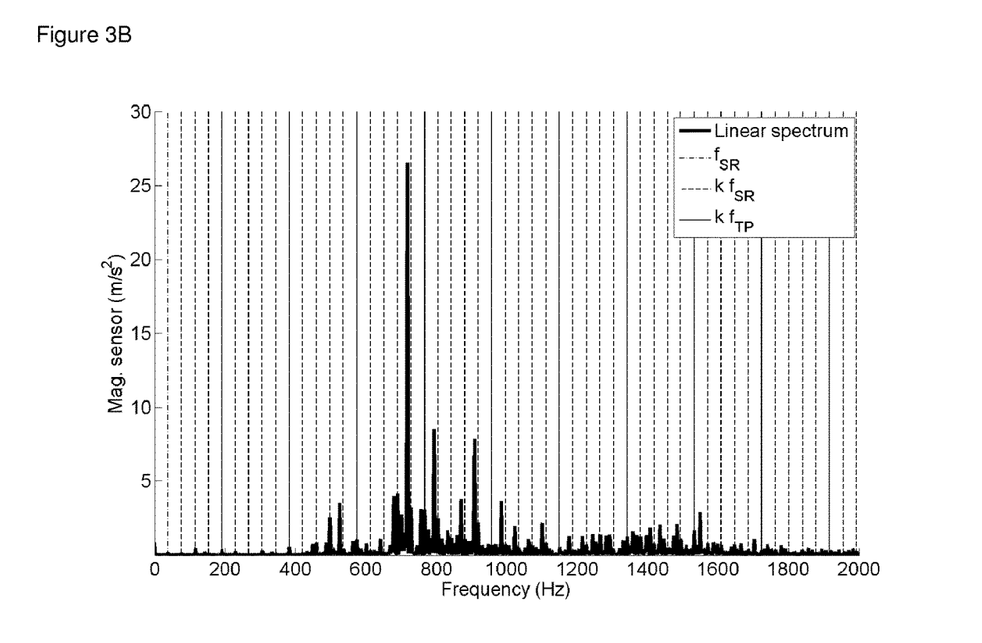

FIGS. 3A and 3B illustrates a linear spectrum of vibration sensor signal measured during milling operation in a chatter condition and a stable condition respectively. The occurrence of chatter vibrations between the tool and the workpiece is detected using for instance microphones or vibration sensors located sufficiently close to the machining point. The frequency analysis (e.g. using the Fast Fourier Transform) of the obtained signal allows the identification of self-excited (chatter) vibrations superimposed to the forced vibrations generated by the cutting process respectively by the machining tool (see FIGS. 3A and 3B). Based on this analysis, the current state of the milling process with its dominant frequencies can be detected (low or high forced vibrations (stable), light or sever chatter).

Referring to FIG. 4, the information provided by the automatic chatter detection system as well as the corresponding machining parameters is centralized via a data connection—for instance a secured network—on a server in order to create a central chatter database.

The central chatter database must contain sufficient information concerning the real conditions so that representative stability lobes diagrams can be derived and compared with the experimental results. More specifically, the database must provide all the information necessary to determine the dynamics of the structural loop composed by the entire machine tool, the tool system and the workpiece at the tool center point (TCP): the type of machine with its axes position and feed direction, the type of tool and its clamping conditions, the spindle rotational speed as well as the geometry of the workpiece, its material and its clamping on the machine table. It must also specify the information required for the characterization of the corresponding cutting force interaction, such as the cutting edge geometry and tribology (tool coating, type of lubrication), resulting chip geometry (depths of cut, tool geometry, feed rate), cutting speed and machined material.

The collected data must then be categorized in order to group together the machining tests realized in similar cutting conditions but with different spindle speeds or depths of cut. For instance, it can be foreseen that two distinct groups of classes are generated for the TCP dynamics and for the cutting force interaction respectively. The combination of both classes is then used to compare the machining conditions between each interconnected machines. FIG. 4 illustrates an example of such possible central chatter database architecture.

Based on the data collected from different networked machines, experimental chatter stability maps can be generated. One can imagine that these experimental stability maps could be provided to a machine or CAM operator or to a machine control system in order to support the selection of adequate cutting parameters based on the experience made with occurred machining operations and collected in those chatter stability maps.

Figure 5:
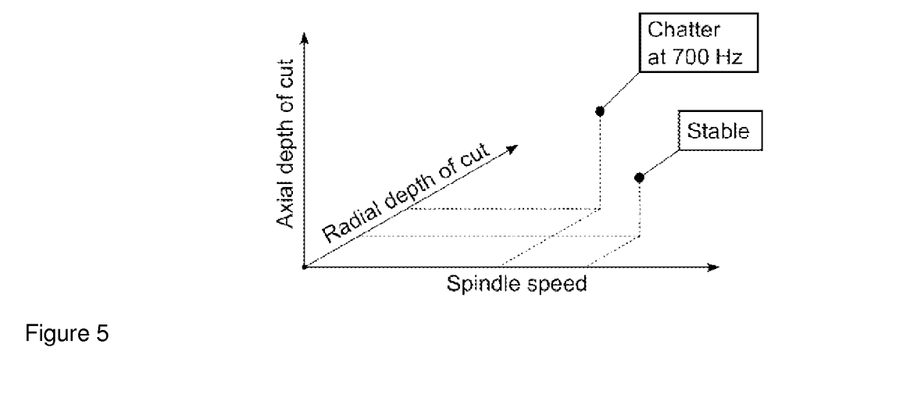
FIG. 5 illustrates experimental results provided by the chatter database represented in a 3 dimensional space defined by the axial and radial depths of cut as well as the spindle speed.

For instance, for a specific machining condition (regarding machine, tool and workpiece), the experimental results provided by the chatter database can be represented in a 3 dimensional space defined by the axial and radial depths of cut as well as the spindle speed, as represented in FIG. 5.

Figure 6:
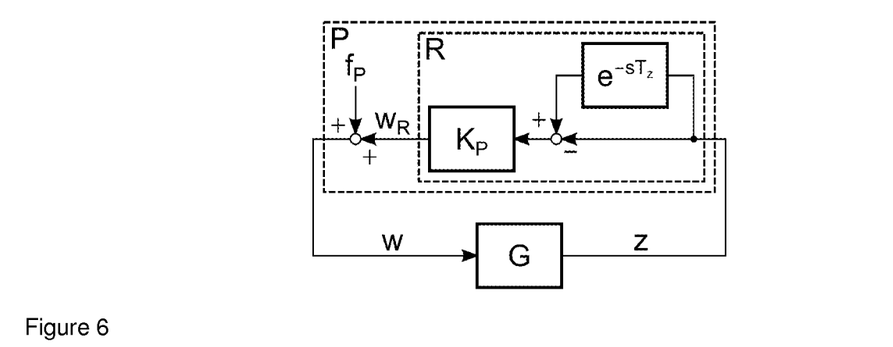
FIG. 6 represents the block diagram of the closed-loop interaction between tool tip dynamics (G) and the machining process (P) considering the regenerative effect (R) susceptible to generate chatter.

On the other hand, for each group of similar machining conditions saved in the database, stability lobes diagrams should be computed based on the models of the TCP dynamics and of the milling process as well as their interaction. FIG. 6 represents the block diagram of the closed-loop interaction between tool tip dynamics (G) and the machining process (P) considering the regenerative effect (R) susceptible to generate chatter.

More specifically, the structural dynamics of the machine between the tool and the workpiece can be derived experimentally by performing frequency response measurements or using modeling methods such as finite element method. A receptance coupling method also allows a combination of both.

An analytical model of the milling process is necessary for the computation of the cutting forces generated at the TCP based on the cutting conditions such as the chip geometry (also dependent on the past and current vibrations between the tool and the workpiece), the cutting speed, tool geometry, workpiece material, lubrication, etc. . . . The empirical force coefficients involved in the analytical model can be found in the literature for well-studied cutting conditions. For undocumented cutting conditions they may be derived experimentally using force sensors for the monitoring of the machining forces. They also can be predicted using first principles physics model based software simulation.

These both models must then be coupled in order to evaluate the stability of the resulting closed-loop system and to derive the stability lobes diagram. Different methods exist for the computation of the stability lobes diagram (e.g. zeroth order approximation, semi-discretization, temporal finite elements).

The generated stability lobes diagrams based on a physical model and the experimental stability maps obtained by the automatic chatter detection system can then be compared. More specifically, for a given spindle speed, the critical depth of cut and the corresponding chatter frequency allow to quantify the agreement between both results.

If possible, the degree of uncertainty related to both results should be estimated (for instance using Monte Carlo method for physical model-based predictions).

Based on a sensitivity study of the physical model-based chatter stability predictions, the eventual difference between both results provides hints for the identification of the error sources in the prediction method and helps to improve the reliability of it (see for example E. Graham et al.).

Apart from milling machines, the proposed concept can easily be applied to the other types of machining tools using which are also confronted with chatter phenomenon, such as turning, boring, drilling, etc.

What is claimed is:

1. A chatter database system, including a central chatter database, which is fed with data corresponding to machining and chatter conditions of machining tools, selected from one of a milling, turning, drilling or boring machining tool, wherein the data fed to the central chatter database is obtained and collected from at least two individual machining tools included in the chatter database system and whereby the data is sent to the central chatter database via a secured network data connection to generate chatter stability maps based on real conditions; and the chatter database system includes a class identification system, included in the central chatter database, whereby the class identification system defines sets of different machining conditions based on the data fed to the central chatter database, including different spindle speeds and different depths of cut, for which chatter conditions provided by different machining operations can be equivalently compared to generate stability maps for the machining tools.

2. The chatter database system according to claim 1, wherein the chatter stability maps generated by the data collected in the central chatter database from the at least two individual machining tools are retrieved by machine controllers of individual machining tools or sent to a Computer Aided Manufacturing (CAM) operator via the data connection.

3. The chatter database system according to claim 1, wherein the at least two individual machining tools include an automatic chatter detection system, which generates chatter condition data.

4. The chatter database system according to claim 1, wherein the at least two individual machining tools include a machine controller, which gathers the machining condition data of the at least two individual machining tools.

5. The chatter database system according to claim 1, wherein the chatter condition data and the machining condition data are gathered by the machine controller and transmitted via the data connection from at least two individual machining tools to the central chatter database.

6. The chatter database system according to claim 1, wherein the chatter database system includes a chatter data verification system, included in the central chatter database, whereby the chatter data verification system checks consistency of the chatter condition data collected in the central chatter database.

7. The chatter database system according to claim 6, wherein the verification system, when inconsistent chatter condition data is detected, removes the inconsistent chatter condition data from the chatter database and generates a warning signal which is delivered to the machine controller of a corresponding machining tool via the data connection.

8. The chatter database system according to claim 1, wherein the chatter database system includes a chatter prediction system with an embedded physical model for calculating and predicting chatter.

9. The chatter database system according to claim 8, wherein the chatter prediction system uses machining and chatter condition data stored in the central chatter database to verify the chatter prediction system calculated chatter prediction and to adjust the embedded physical model.

10. The chatter database system according to claim 9, wherein adjustment of the embedded physical model occurs with an algorithm, the adjustment occurs after a predefineable amount of new data sets with machining and chatter conditions fed to the central chatter database.

11. The chatter database system according to claim 8 wherein the chatter prediction system is included in the central chatter database, the calculated chatter prediction for a given set of machining conditions is also stored in the central chatter database and whereby the machining controllers of connected at least two individual machining tools can retrieve the chatter predictions via the data connection.

12. The chatter database system according to claim 8, wherein the chatter prediction system is implemented in the machine controller of the at least two individual machining tools, whereby the prediction system retrieves from the central chatter database stored chatter data corresponding to machining conditions equivalent to foreseen machine parameter settings of the at least two individual machining tools for predicting therewith the occurrence of chatter during operation of the machine tool.

13. A system for predicting and reducing chatter during high performance machining by machining tools selected from one of milling, turning, drilling, and boring tools, the system comprising:

a central chatter prediction and reduction controller configured to receive data obtained and collected from at least two of the machining tools included in the system, the data is sent to the central chatter prediction and reduction controller by way of a secured network data connection, the data corresponds to machining and chatter conditions of the at least two of the machining tools, the central chatter prediction and reduction controller is further configured to generate chatter stability maps based on the data received; and a class identification system included with the chatter prediction and reduction controller, the class identification system is configured to define sets of different machining conditions based on the data received by the central chatter prediction system, including different spindle speeds and different depths of cut, for which chatter conditions provided by different machining operations can be equivalently compared to generate stability maps for the machining tools.

\* \* \* \* \*